United States Patent
Crosby et al.

(10) Patent No.: US 9,268,624 B2
(45) Date of Patent: Feb. 23, 2016

(54) APPLICATION MONITORING OF RELATED ACTIVITIES ACROSS MULTIPLE THREADS

(71) Applicant: Riverbed Technology, Inc., San Francisco, CA (US)

(72) Inventors: Peter Anthony Crosby, Edmond, OK (US); Robert Meagher, Greenfield, NH (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 201 days.

(21) Appl. No.: 13/965,605

(22) Filed: Aug. 13, 2013

(65) Prior Publication Data

US 2014/0136691 A1    May 15, 2014

Related U.S. Application Data

(60) Provisional application No. 61/725,517, filed on Nov. 13, 2012.

(51) Int. Cl.
    *G06F 15/173*    (2006.01)
    *G06F 11/00*     (2006.01)
    *G06F 11/34*     (2006.01)

(52) U.S. Cl.
    CPC .......... *G06F 11/006* (2013.01); *G06F 11/3404* (2013.01); *G06F 11/3476* (2013.01); *G06F 2201/865* (2013.01)

(58) Field of Classification Search
    CPC .............. G06F 11/006; G06F 11/3476; G06F 11/3404; G06F 2201/865
    USPC .................................................. 709/203, 223
    See application file for complete search history.

(56) References Cited

U.S. PATENT DOCUMENTS

| | | | |
|---|---|---|---|
| 6,968,540 B2 | 11/2005 | Beck et al. | |
| 8,495,577 B2 | 7/2013 | Crosby | |
| 9,043,760 B2 * | 5/2015 | Fulton et al. | 717/128 |
| 2004/0019891 A1 * | 1/2004 | Koenen | 718/102 |
| 2005/0131916 A1 * | 6/2005 | Banatwala et al. | 707/100 |
| 2006/0248151 A1 * | 11/2006 | Belakovskiy et al. | 709/206 |
| 2009/0055802 A1 | 2/2009 | Crosby | |
| 2009/0157819 A1 * | 6/2009 | Hampton | 709/206 |
| 2011/0307905 A1 * | 12/2011 | Essey et al. | 719/318 |
| 2012/0226804 A1 * | 9/2012 | Raja et al. | 709/224 |

* cited by examiner

*Primary Examiner* — Michael Y Won
(74) *Attorney, Agent, or Firm* — Park, Vaughan, Fleming & Dowler LLP; Laxman Sahasrabuddhe (57) ABSTRACT

Embodiments provide systems, methods, and computer program products for monitoring application performance in multithreaded environments. Monitoring data may be inserted into data structures that propagate and persist between threads involved in a processing event. Data related to specific methods executing on each thread may be output to a trace file. The trace file may be analyzed for application performance by associating the threads that contain the same tracking data from the propagated data structure.

20 Claims, 8 Drawing Sheets

Figure 1:
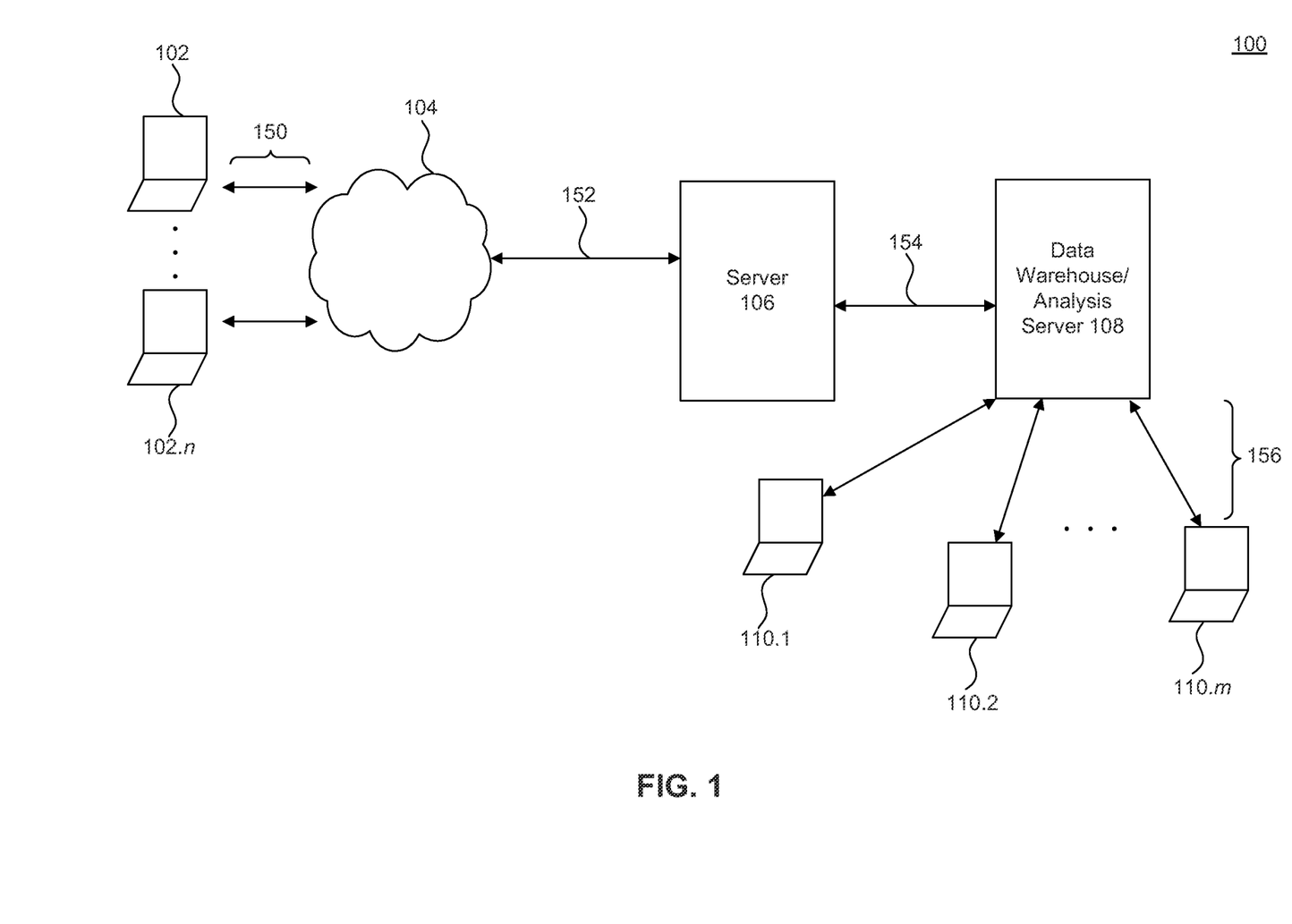
FIG. 1 illustrates an exemplary network environment in which transactions may occur, according to an embodiment.

FIG. 8 ent of the present disclosure. Example network environment 100 is provided for the purpose of illustration and is not limiting of embodiments of the present disclosure. As will be discussed in more detail with respect to the various embodiments and figures below, embodiments of the present disclosure enable the monitoring of software application performance in environments where tasks may be divided into multiple sub-tasks executed concurrently on separate threads. This may be performed by inserting monitoring data into data structures that propagate between the threads involved in a processing event, for example a transaction. In one embodiment, the data structure may be a security context or a logical call context, to name a few examples. The call context found in the .NET Framework, by Microsoft®, is just one example. For simplicity of discussion, call context will be used when describing the various embodiments.

APPLICATION MONITORING OF RELATED ACTIVITIES ACROSS MULTIPLE THREADS

CROSS-REFERENCE TO RELATED APPLICATIONS

The present application claims the benefit of U.S. Provisional Patent Application No. 61/725,517, filed on Nov. 13, 2012, which is incorporated herein by reference in its entirety.

TECHNICAL FIELD

The present disclosure relates generally to software application performance monitoring in environments where tasks may be divided into multiple sub-tasks executed concurrently on separate threads.

BACKGROUND

Modern application servers typically handle many business transactions concurrently. Software applications on the servers are often designed to divide the work for a particular task into one or more sub-tasks. Each transaction, in turn, may be divided into activities spread over multiple threads of execution. These sub-tasks are then executed in parallel by a processor using different threads of activity. This could result in hundreds or even thousands of threads being active within a server process at any given time.

It is challenging to conduct performance analysis and troubleshooting of these actions because the different threads performing sub-tasks lack information that indicates their relationship to one another. Accordingly, there is a need for methods, systems, and computer program products to relate different threads performing related tasks and sub-tasks to each other to provide a comprehensive view of application performance for monitoring and troubleshooting purposes.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

FIG. 1 illustrates an exemplary network environment 100 in which transactions may occur, according to an embodiment of the present disclosure. Example network environment 100 is provided for the purpose of illustration and is not limiting of embodiments of the present disclosure. As will be discussed in more detail with respect to the various embodiments and figures below, embodiments of the present disclosure enable the monitoring of software application performance in environments where tasks may be divided into multiple sub-tasks executed concurrently on separate threads. This may be performed by inserting monitoring data into data structures that propagate between the threads involved in a processing event, for example a transaction. In one embodiment, the data structure may be a security context or a logical call context, to name a few examples. The call context found in the .NET Framework, by Microsoft®, is just one example. For simplicity of discussion, call context will be used when describing the various embodiments.

In embodiments of the present disclosure, data regarding the sequence of method calls executing on each individual thread may be output to a trace file. This information may be later examined and the sequence of method calls on each individual thread may be associated with the same transaction on whose behalf they were executing. Performance analysis may then be performed by focusing on the threads that executed on behalf of the same transaction. Embodiments of the present disclosure will be discussed in terms of execution of a transaction by way of example only. As those skilled in the relevant art(s) will recognize, embodiments of the present disclosure may be utilized whenever there may be processing across multiple threads and/or processors.

As shown in FIG. 1, example network environment 100 includes a plurality of user terminals 102 through 102.n, network 104, server 106, data warehouse 108, and client terminals 110.1 through 110.m. In an embodiment, the plurality of user terminals 102 through 102.n may be personal computing devices, such as desktop computers, laptop computers, tablet computers, mobile phones, PDAs, just to name a few examples, or any combination of the above. A user terminal 102 may initiate a transaction request. The user of user terminal 102 may be a human. Alternatively, the user may be any computer or application capable of requesting the use of computing resources on the server 106. For example, the request may be based on the user's browsing of a particular website, use of a cloud computing service, or some other remote application as will be understood by a person skilled in the relevant art(s).

The user terminal 102 may transmit the transaction request to the server 106 via a network 104. The user terminal 102 may connect to the network 104 via connection 150, and the server 106 may connect to the network 104 via connection 152. In one example, the network 104 may be the Internet connecting the server 106, e.g. a web server, to the user terminal 102. The server 106 may be any type of computing device configured to perform processing tasks on behalf of a user, as will be discussed in more detail below with respect to FIGS. 3 and 8.

The server 106 may begin processing the transaction request upon receipt. Processing the transaction request may include breaking down the processing into one or more sub-tasks. In an embodiment, the server 106 may process the one or more sub-tasks sequentially or in parallel using a plurality of threads. Each thread may be a sequence of instructions that the server 106 can process independent of other threads. Various types and implementations of multithreading are possible, as will be recognized by those skilled in the relevant art(s).

In an embodiment, the server 106 may include a monitoring system for monitoring the performance of each thread instantiated and/or used for processing the transaction request (typically broken down into tasks and sub-tasks) from user terminal 102. The monitoring system may instrument application code involved in the processing, such that when particular functions or methods are called and run, the monitoring system may output tracking data to a trace file. For purposes of this application, "instrumenting" application code refers to the process in which monitoring code is added to existing application code that causes callbacks to occur to the monitoring system whenever specific methods within the existing application code are started and completed. This enables the monitoring system to monitor software and/or system performance while the server is running.

Figure 3:
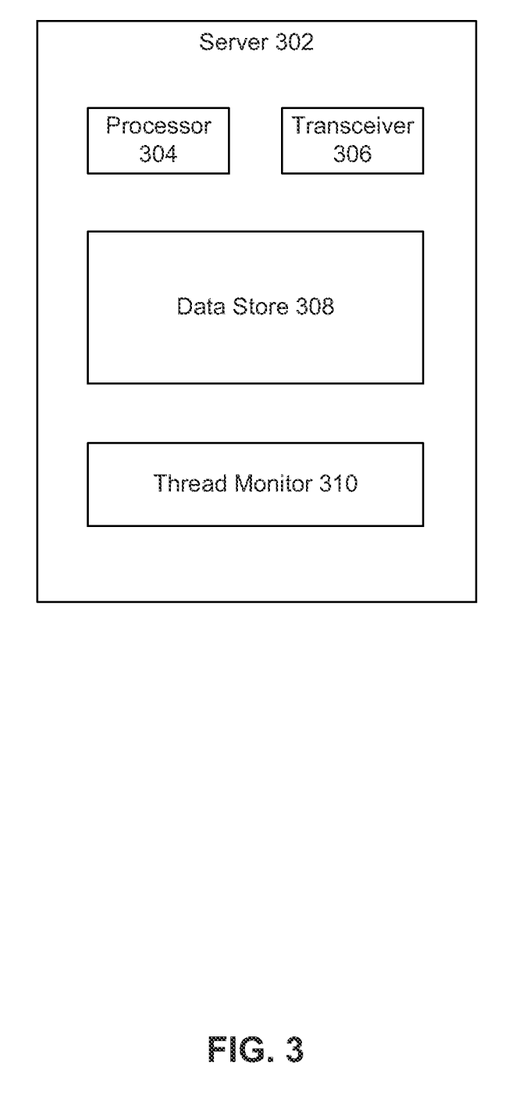
FIG. 3 illustrates an exemplary server apparatus according to an embodiment.

One exemplary embodiment for the server 106 is depicted in FIG. 3 as server 302. In FIG. 3, server 302 may include one or more processors 304. The one or more processors 304 may each include one or more processing cores, capable of performing parallel or sequential operations, for example by use of threads. Server 302 may also include a transceiver 306, for example an Ethernet connection, WiFi connection, or other connection capable of enabling the server 302 to transmit and receive data from external sources, such as user terminal 102 of FIG. 1.

Server 302 may include data store 308, for example a hard drive, flash drive, or other types of memory as will be understood by persons skilled in the relevant art(s). The data store 308 may store the application used in completing the transaction request. When the server 302 starts the application necessary to complete the transaction request from user terminal 102, the application may break the request down into tasks and sub-tasks for execution by one or more threads. The server 302's monitoring system may include thread monitor 310, which may monitor the activity of the one or more threads related to the transaction request. The thread monitor 310 may be a separate application residing in data store 308, an application residing in a separate data store in server 302, a hardware circuit (e.g. ASIC), or some combination of the above.

In an example, when the processor 304 begins executing the tasks and/or sub-tasks by way of one or more functions or methods by the one or more threads, each thread may output data to the trace file when specific methods/functions of interest are called within each thread. As calls to these methods are made, data is recorded to the trace file which includes, for each method, a thread identifier, a transaction identifier, the method called, the time the method was called, pre-selected parameter values, and other properties associated with the calls as will be recognized by those skilled in the relevant art(s). In an exemplary embodiment, the trace file may be stored within data store 308.

Returning now to FIG. 1, as the server 106 is processing the request and data is being output to the trace file, the trace file may be periodically offloaded to the data warehouse 108 via data link 154 for longer-term storage and analysis. As an alternative to the server 106 and data warehouse 108 being separate devices in FIG. 1, the data warehouse 108 may be implemented within the server 106. In an embodiment, the server 106 may harvest and push the trace file to the data warehouse 108 on a periodic basis, for example every 30 seconds. Alternatively, the server 106 may push the trace file to the data warehouse 108 after a certain amount of data is stored in a temporary buffer in server 106. As another alternative example, the data warehouse 108 may pull the trace file from the server 106. These are just a few examples of how the data in the trace file may be stored or archived in the data warehouse 108. Additional alternatives are possible, as will be recognized by persons skilled in the relevant art(s).

Once the trace file is stored, the data warehouse 108 may analyze the performance of the application used to complete the transaction request by the user terminal 102. This performance analysis may be performed automatically according to pre-defined user preferences and limits, or may be performed in response to specific commands from the client terminals 110.1 through 110.m. The client terminals 110.1 through 110.m may be directly or indirectly connected to the data warehouse 108, for example by a network similar to the network 104. For example, a user at client terminal 110.1 may instruct the data warehouse 108 to stitch together all of the tasks and sub-tasks executed on behalf of a particular transaction. The stitching may be based on a common identifier that was propagated, for example, by the call context within each thread executed by server 106, as will be discussed in more detail below.

Figure 2:
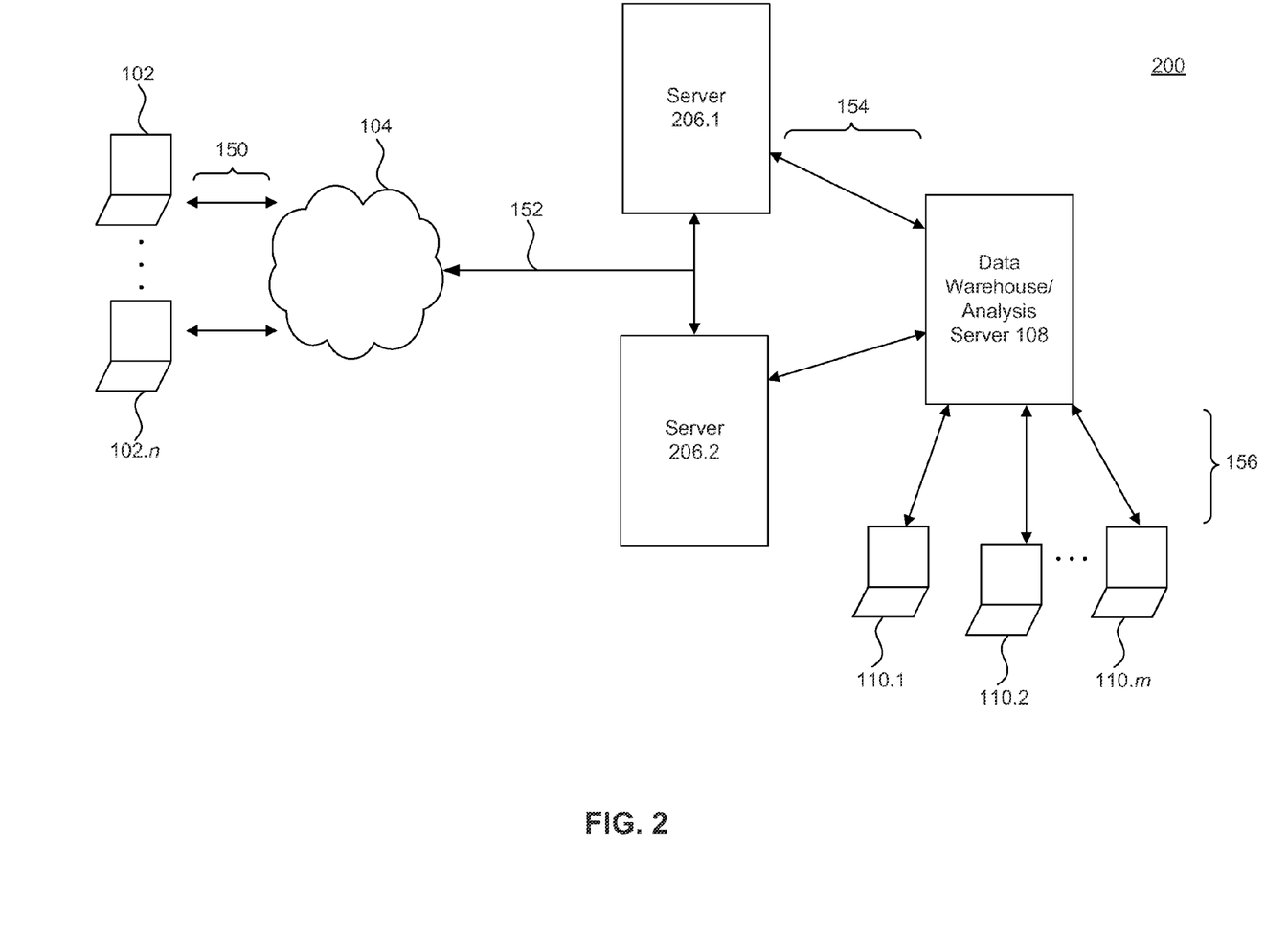
FIG. 2 illustrates an exemplary network environment in which transactions may occur, according to an alternative exemplary embodiment.

FIG. 2 illustrates an exemplary network environment in which transactions may occur, according to an alternative exemplary embodiment. Only those differences from FIG. 1 will be addressed. Instead of a single server 106, transactions requested by a user terminal 102 may be processed by a plurality of servers 206.1 through 206.2. This number is exemplary only. Any number of servers may be implemented to process transaction requests, as will be recognized by those skilled in the relevant art(s).

While multiple servers 206.1 and 206.2 are used to process the transaction request from user terminal 102, embodiments of the present disclosure can still track individual threads utilized to perform tasks and sub-tasks related to the transaction request. The tracked data can still be output to one or more trace files at each server 206.1 and 206.2. Alternatively, the tracked data can be output to another server or data store not shown in FIG. 2. Similar to FIG. 1, the trace files can be harvested and collected by the data warehouse 108 for longer-term storage and analysis.

The data warehouse 108 may stitch together all of the tasks and sub-tasks executed on behalf of a particular transaction on both of the servers 206.1 and 206.2. The stitching may be based on a common identifier that was propagated, for example, by the call context within each thread among the servers 206.1 and 206.2.

As would be understood by a person skilled in the relevant art(s) based on the teachings herein, embodiments of the present disclosure may be performed in other exemplary environments, for example in any situation in which a computing device, such as a server, performs tasks and sub-tasks on behalf of an application or transaction request.

Figure 4:
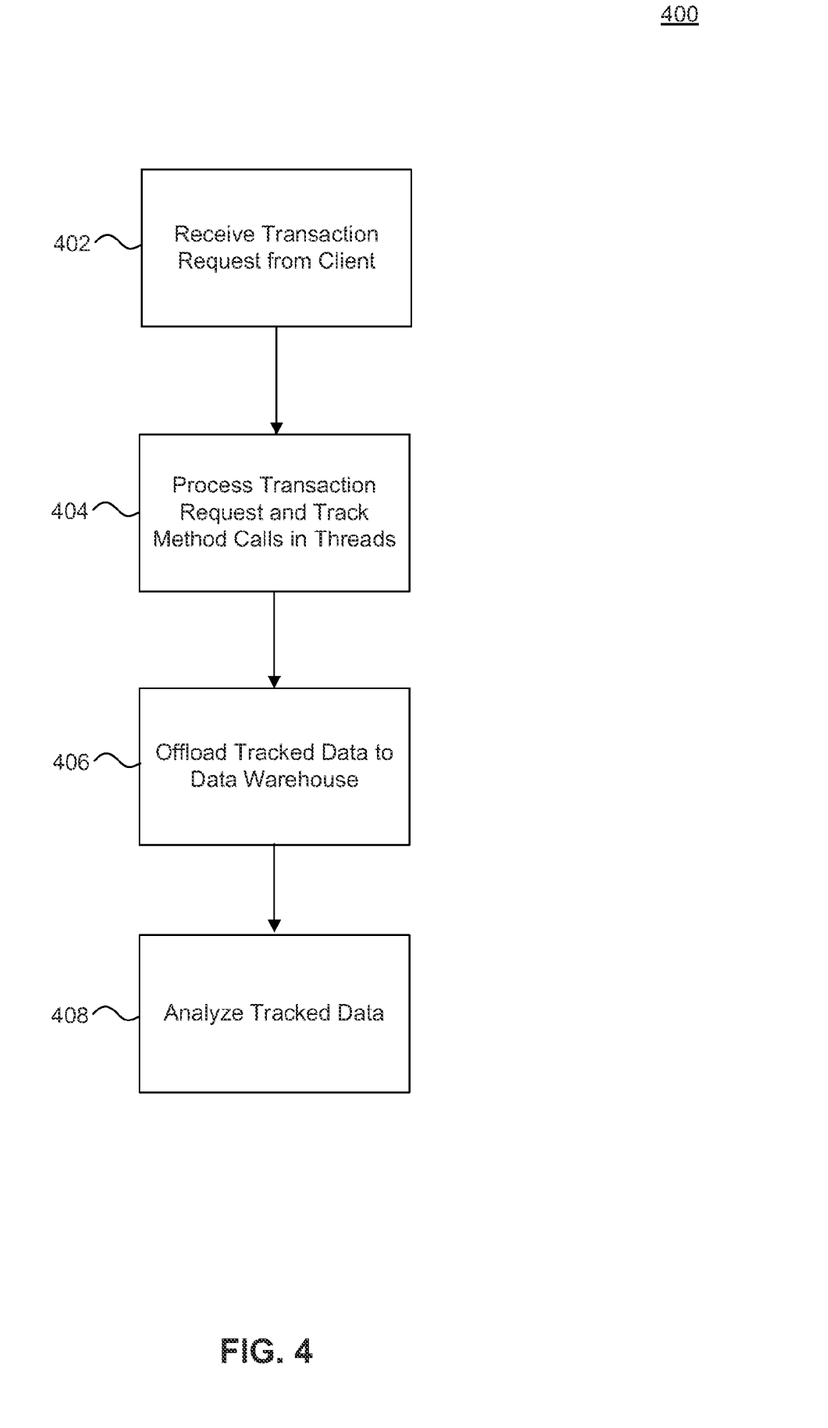
FIG. 4 illustrates an exemplary flowchart of a process for monitoring application performance according to an embodiment.

FIG. 4 illustrates an exemplary flowchart of a process 400 for monitoring application performance according to an embodiment. Process 400 provides a high-level view of an exemplary embodiment for application performance monitoring, which will be discussed in more detail in subsequent figures. Although the exemplary process 400 may be performed on any number of computing devices, the present discussion will be with respect to an exemplary server, such as server 106 discussed with respect to FIG. 1.

At step 402, the server 106 receives a transaction request from a client, for example user terminal 102.

At step 404, the server 106 begins processing the transaction request and monitors the methods called by the application (residing on server 106) used to process the transaction. Server 106 may monitor the classes and methods, for example, using thread monitor 310. In an embodiment, only specific classes and methods are identified and instrumented for monitoring. When the specific methods are called in a thread processing a related task or sub-task, the thread may output tracked data to a trace file. The tracked data may be stored in a single trace file or a plurality of trace files.

At step 406, the tracked data, for example contained in the trace files, may be offloaded to the data warehouse 108.

At step 408, the data warehouse 108 analyzes the tracked data based on pre-defined criteria or in direct response to specific commands by a user interested in performance data. In an example, the data warehouse 108 may stitch together all of the threads that performed tasks and sub-tasks on behalf of a particular transaction. The stitching may be based on a common identifier that was propagated within each thread executed by server 106.

Figure 5:
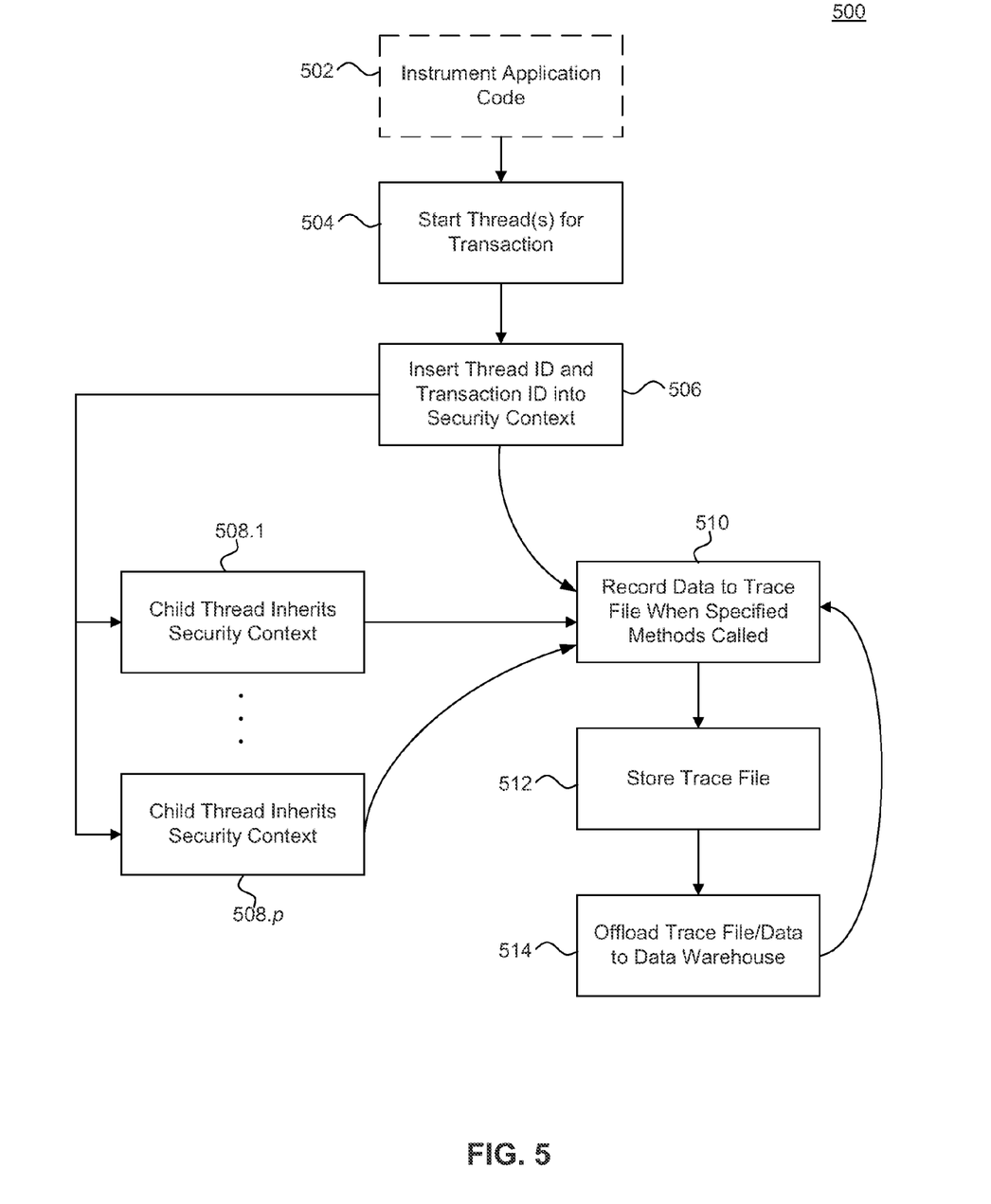
FIG. 5 illustrates an exemplary flowchart of a process for monitoring application performance during processing of a transaction, according to an embodiment.

FIG. 5 illustrates an exemplary flowchart of a process 500 for monitoring application performance during processing of a transaction, according to an embodiment. Process 500 may be a more detailed flowchart of the process 400 from the perspective of the server 106 processing the transaction request.

At step 502, the server 106, for example using thread monitor 310, may instrument the application code that may be used in response to the transaction request. FIG. 5 illustrates step 502 as an optional step, because the application code may have been instrumented previously. In that situation, the process 500 begins at step 504. If the application code has not been instrumented previously, however, the server 106 instruments the application code so that methods may be monitored. The application code may be instrumented such that the application code or executable file does not have to be modified. Instead, techniques may be used that, for example, may add monitoring code to an in-memory representation of portions of the application code after loading but before linking U.S. Pat. No. 6,968,540, issued Nov. 22, 2005, and commonly owned with the present application, discusses techniques for instrumenting object-oriented software without requiring modification to existing source code or executable files. The disclosure of U.S. Pat. No. 6,968,540 is incorporated herein by reference in its entirety as though set forth in full below.

According to embodiments, not every method of the application code must be instrumented. Instead, specific methods may be autonomously selected for performance monitoring based on identified characteristics in the methods. Particular characteristics may be related to aspects of methods that are likely candidates for performance improvement. The autonomous selection of particular methods for monitoring may change over time based on, for example, the methods' likelihood for performance improvement. Alternatively, the selection of particular methods may remain static, for example based on a prior autonomous selection or an express specification by a user. U.S. Application No. 2009/0055802, filed Jul. 18, 2008, discusses routines for selecting methods to monitor. The disclosure of U.S. Application No. 2009/0055802 is incorporated herein by reference in its entirety as though set forth in full below.

In step 504, the server 106 may start one or more threads to handle the transaction request. The thread may be drawn from a thread pool of existing (e.g., idle) threads, as will be recognized by those skilled in the relevant art(s), or alternatively may be a new thread started by the server 106. The thread, in turn, may start additional threads to handle sub-tasks to the main task associated with the transaction request. The first thread started to handle the transaction request may be called the "parent thread" for purposes of discussion, while each thread started to handle sub-tasks to the main task may be called a "child thread."

At step 506, the server 106's monitoring system, for example the thread monitor 310, may insert a thread identifier and transaction identifier into the call context, such as a security context, of the thread, as will be discussed in more detail in FIG. 6 below. The thread identifier and transaction identifier may each be alphanumeric, for example. The call context may provide the access rights or privileges of a thread. As one example, a person logged in as an administrator to a web site may be allowed to do or see things which an anonymous user cannot. When security-critical actions such as file system access occur, the runtime may make a check against the call context to ensure that the user, with which the current thread is associated, is allowed to perform the operation. If a parent thread delegates some part of its activity to a child thread, the language runtime may pass on the call context to the child thread. Embodiments of the present disclosure can take advantage of the passing of the call context across threads.

If the thread which received the thread identifier and transaction identifier in step 506 is a parent thread, then all child threads to that parent thread will inherit the call context of the parent thread. For example, in FIG. 5 this is depicted at steps 508.1 through 508.p with p different child threads inheriting the call context of their parent thread. This inheritance may include the thread and transaction identifiers of the parent thread.

As the parent and child threads perform their assigned tasks and/or sub-tasks, tracked data is recorded to the trace file at step 510. This tracked data may originate, for example, at the beginning and ending of specific methods which the application code has been instrumented to monitor. Tracked data for each thread may be organized in a single trace file over a specific period of time or a specific amount of data, or may be output into a plurality of discrete trace files.

At step 512, the trace file(s) may be stored temporarily in a data store of the server 106, for example the data store 308 of FIG. 3.

At periodic intervals, the trace file may then be offloaded to the data warehouse 108 at step 514, as discussed above with respect to FIG. 1. This process of tracking data, recording to file, storing, and offloading to data warehouse 108 may continue while the one or more threads are performing any tasks or sub-tasks related to the same transaction request, and which call methods that the thread monitor 310 has instrumented the application code for monitoring.

In one example, the process 500 makes use of the .NET class System.Remoting.Messaging.CallContext. An object of this class may be propagated from parent threads to child threads by the .NET framework when new threads are created and when work items are handed off to threads in the thread pool for processing. The SetData method in the .NET framework may be called by the parent thread at the start of each transaction in order to inject the parent thread's identifier and transaction identifier for the current parent transaction. The child thread may then interrogate this data using CallContext.GetData and record the returned information in the trace file that is recording application activities. As will be recognized by those skilled in the relevant art(s), this is only one example among many.

Figure 6:
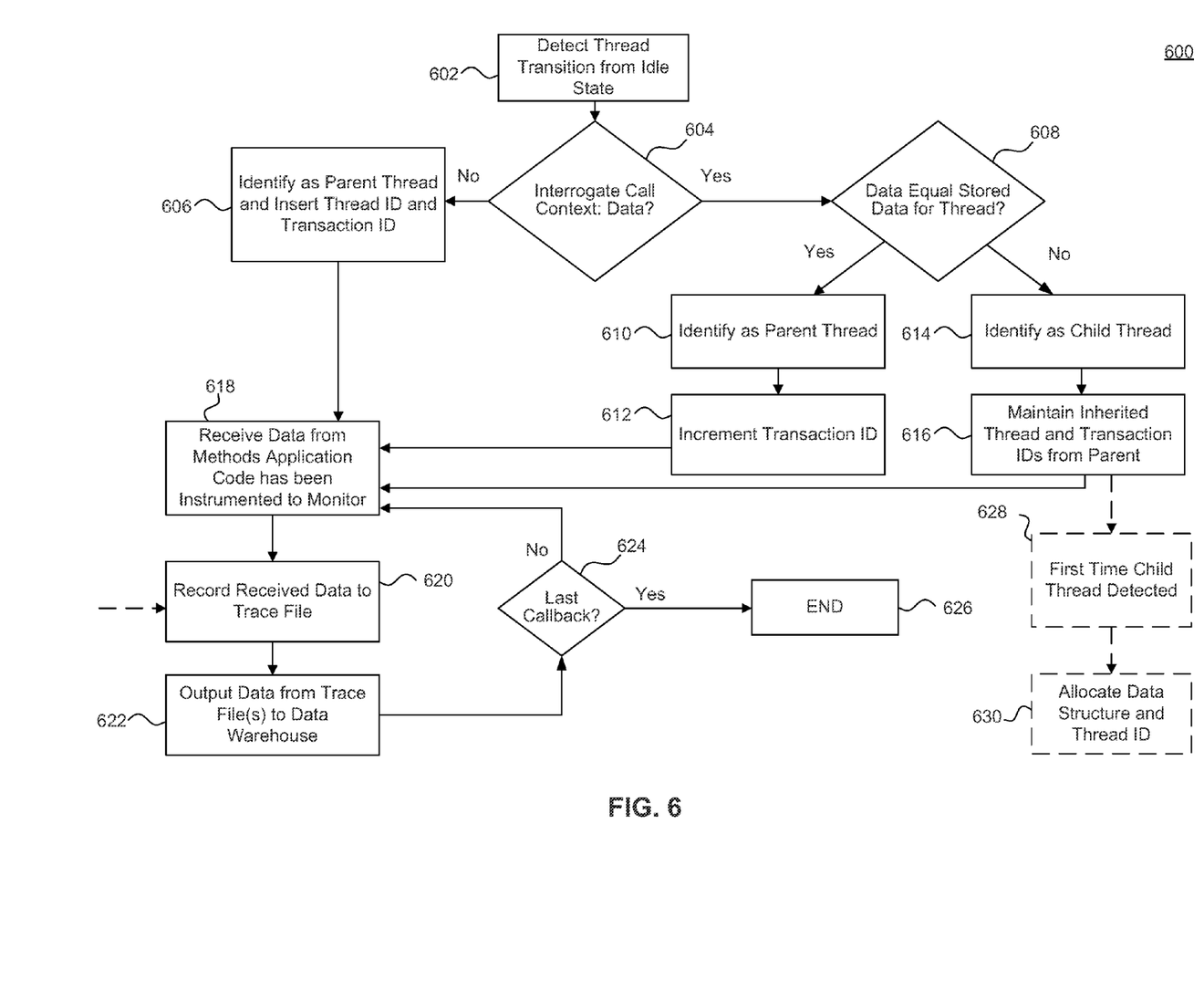
FIG. 6 illustrates an exemplary flowchart of a process for monitoring application performance according to an embodiment.

FIG. 6 illustrates an exemplary flowchart of a process 600 for monitoring application performance according to an embodiment. Process 600 may be, for example, a more thorough depiction of the process 500 according to an embodiment.

At step 602, the monitoring system of server 106, for example thread monitor 310, detects the transition of a thread from an idle state to an active state. As will be recognized by those skilled in the relevant art(s), other hardware and/or software may perform the monitoring and other functions discussed in the various steps below. For simplicity of discussion, the process 600 will be discussed with respect to thread monitor 310.

At decision step 604, the thread monitor 310 interrogates the call context of the thread and determines whether the call context includes monitoring data, for example the thread identifier and the transaction identifier for the thread. Each thread may have a call context that persists across tasks. Each thread may maintain the security permissions of the server 106 in its call context when unassigned. After the thread has been assigned a particular task, with an associated level of security permissions unique to that task stored in the call context, the thread may revert back to its original security state and again maintain the security permissions of the server 106 while unassigned, for example in a thread pool.

If the call context does not include monitoring data, then the process 600 proceeds to step 606. If the call context does include monitoring data, then the process 600 proceeds to decision step 608.

At step 606, the thread monitor 310 determines that the thread is a parent thread because it has no existing monitoring data. This determination may be based on the assumption that a child thread would have inherited the call context of the parent thread. Process 600 then proceeds to step 618, discussed below.

At decision step 608, when the call context includes monitoring data, the thread monitor 310 compares the monitoring data with stored monitoring data that the thread monitor 310 maintains for each recognized thread. In one embodiment, the thread monitor 310 maintains a separate data structure on a per-thread basis. For example, each data structure may store, among other things, the unique thread identifier assigned to the corresponding thread (and which is stored in the corresponding thread's call context when a parent thread) and the transaction identifier.

If at decision step 608 the thread monitor 310 determines that monitoring data in the call context matches the stored monitoring data for the thread, the process 600 proceeds to step 610. At step 610, the thread monitor 310 may identify the thread as a parent thread because the monitoring data matches. The process 600 then proceeds to step 612, where the thread monitor 310 updates the transaction identifier, for example by incrementing it. This situation may occur, for example, where the thread was previously assigned a thread identifier and a transaction identifier and has now been given a new task for which it is the parent thread.

If at decision step 608 the thread monitor determines that the monitoring data in the call context does not match the stored monitoring data, the process proceeds to step 614 at which the thread is identified as a child thread. At step 616, the child thread maintains the thread identifier and transaction identifier inherited from the parent thread. This enables the later stitching together of the various threads for performance analysis of a given transaction, for example by the data warehouse 108.

When the child thread is a new thread, for example a thread drawn from the thread pool that has not executed instrumented application code yet or a thread that is newly started, process 600 may include steps 628 and 630. At step 628, it is determined that the thread monitor 310 has not previously detected the child thread. The process 600 may then proceed to step 630, where the thread monitor 310 may allocate a data structure for the child thread. The thread monitor 310 may also assign a thread identifier and transaction identifier for the thread. While a child thread, however, the thread monitor 310 will not insert the thread and transaction identifiers into the child thread's call context; instead, for the duration of the execution of the present sub-task, the child thread will maintain the thread and transaction identifiers of the parent thread.

The process 600 proceeds to step 618, either from step 606, step 612, or step 616 on the basis of the determinations at steps 604 and 608. At step 618, the one or more instrumented methods output tracked data. In one embodiment, the thread monitor 310 may receive the tracked data and record the tracked data to one or more trace files in step 620. In an alternative embodiment, the one or more instrumented methods may output tracked data directly to one or more trace files in step 620.

The process 600 proceeds to step 622, where the one or more trace files may be output to an external system for long-term storage and analysis, for example the data warehouse 108. In an alternative embodiment, the trace files may remain at the server 106 long-term for storage and/or analysis. In embodiments where the trace files are harvested and output to an external system, the trace files may then be deleted from the memory of the server 106 where the processing is occurring.

At decision step 624, the thread monitor 310 determines whether there are any additional callbacks of instrumented methods. The process 600 may continue receiving, storing, and outputting data for analysis from each involved thread until the overarching transaction request is completed or the process 600 is otherwise interrupted, cancelled, or stopped.

If there are no more callbacks from instrumented methods, the process 600 ends at step 626.

Figure 7:
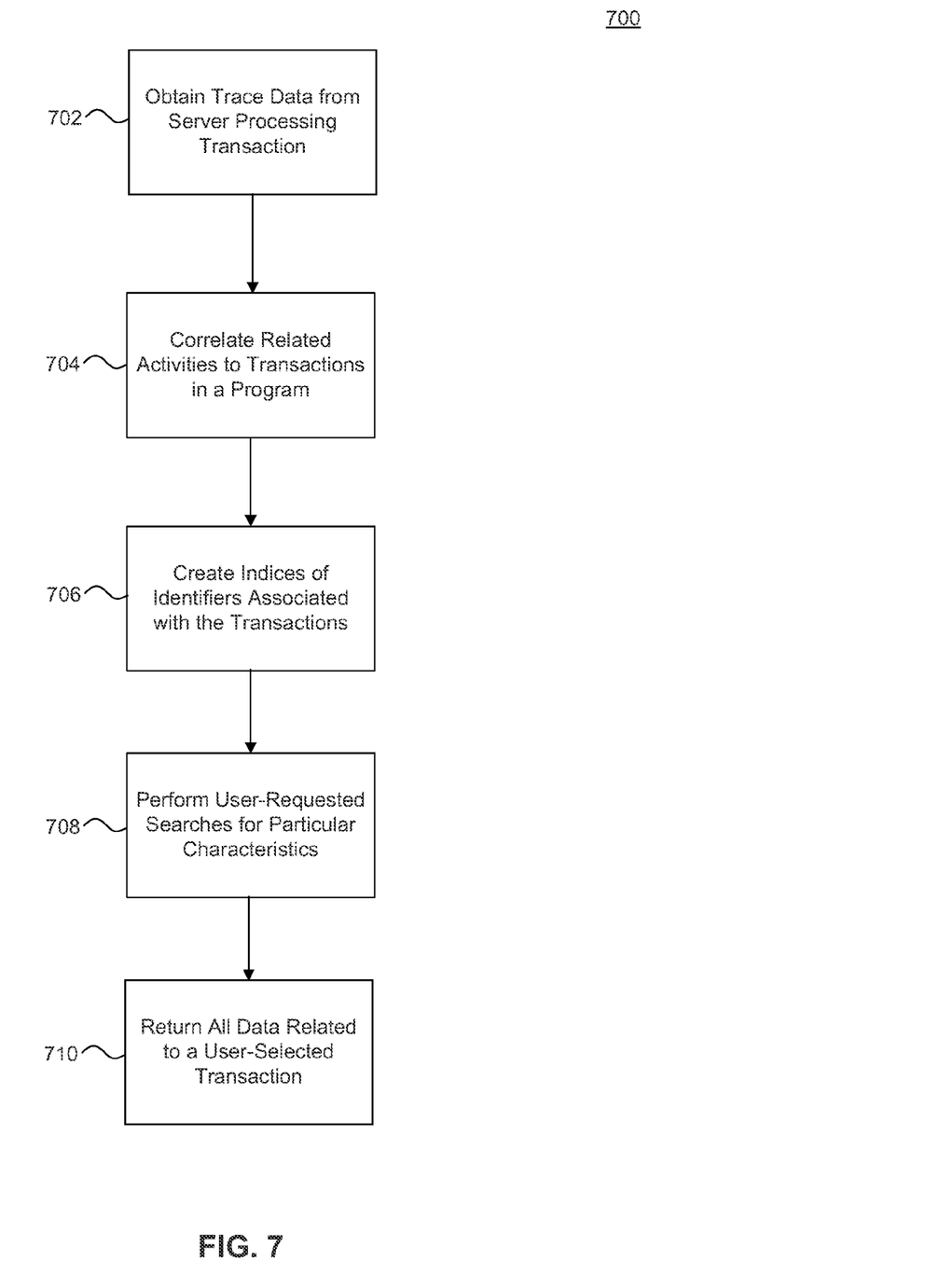
FIG. 7 illustrates an exemplary flowchart of a process for conducting application performance analysis according to an embodiment.

FIG. 7 illustrates an exemplary flowchart of a process 700 for conducting application performance analysis according to an embodiment. In one example, the process 700 occurs at the data warehouse 108, although other computers/systems may perform the steps in FIG. 7. The following discussion will reference data warehouse 108 for simplicity of discussion.

At step 702, the data warehouse 108 may obtain trace data from the server processing the requested transaction(s), for example from server 106. As discussed above, the data warehouse 108 may receive the trace files from server 106 whenever the trace files are pushed from server 106. Alternatively, the data warehouse 108 may pull the trace files according to a pull scheme.

As will be recognized by those skilled in the relevant art(s), the data warehouse 108 may receive or pull trace files from one or a plurality of servers that implement one or more embodiments of the present disclosure. In one example, the data warehouse 108 may receive trace files from dozens to thousands of servers processing transaction requests from one or more users at user terminals 102 through 102.n. Similarly, the data warehouse 108 may include one or more servers or other computing devices tasked with storing data and/or conducting performance analysis.

Once the data warehouse 108 receives the trace files, process 700 proceeds to step 704. At step 704, the data warehouse correlates activities from one or more threads to the application that caused them to occur, for example based on the data propagated by the call context.

At step 706, the data warehouse 108 creates indices of transaction identifiers, thread identifiers, and other data recorded to the trace files and associated with the transaction requests.

At step 708, the data warehouse 108 performs user-specified searches and analyses through and on the tracked data gathered. For example, users may access the data via the client interfaces 110.1 through 110.m. Using the interfaces, users may search for particular characteristics related to individual transactions. Examples include searches based on user identity, duration of processing and method calls, just to name a few.

At step 710, the data warehouse 108 returns the requested data to the user. For example, the data warehouse 108 may return the data as a bundle that shows all of the data related to a particular transaction requested by a user.

Embodiments of the present disclosure enable users to examine all of the application code executed on the various threads associated with the particular transaction request, while excluding data from unrelated, concurrently executing activities on other threads. Embodiments of the present disclosure may also extend to the propagation of the call context in cross-app domain and cross-process remoting calls in a multi-tiered environment, for example across multiple web servers acting in coordination to complete a transaction request by a web user. Embodiments of the present disclosure may stitch together trace files taken in these multi-tier environments, as discussed with respect to the figures above.

Figure 8:
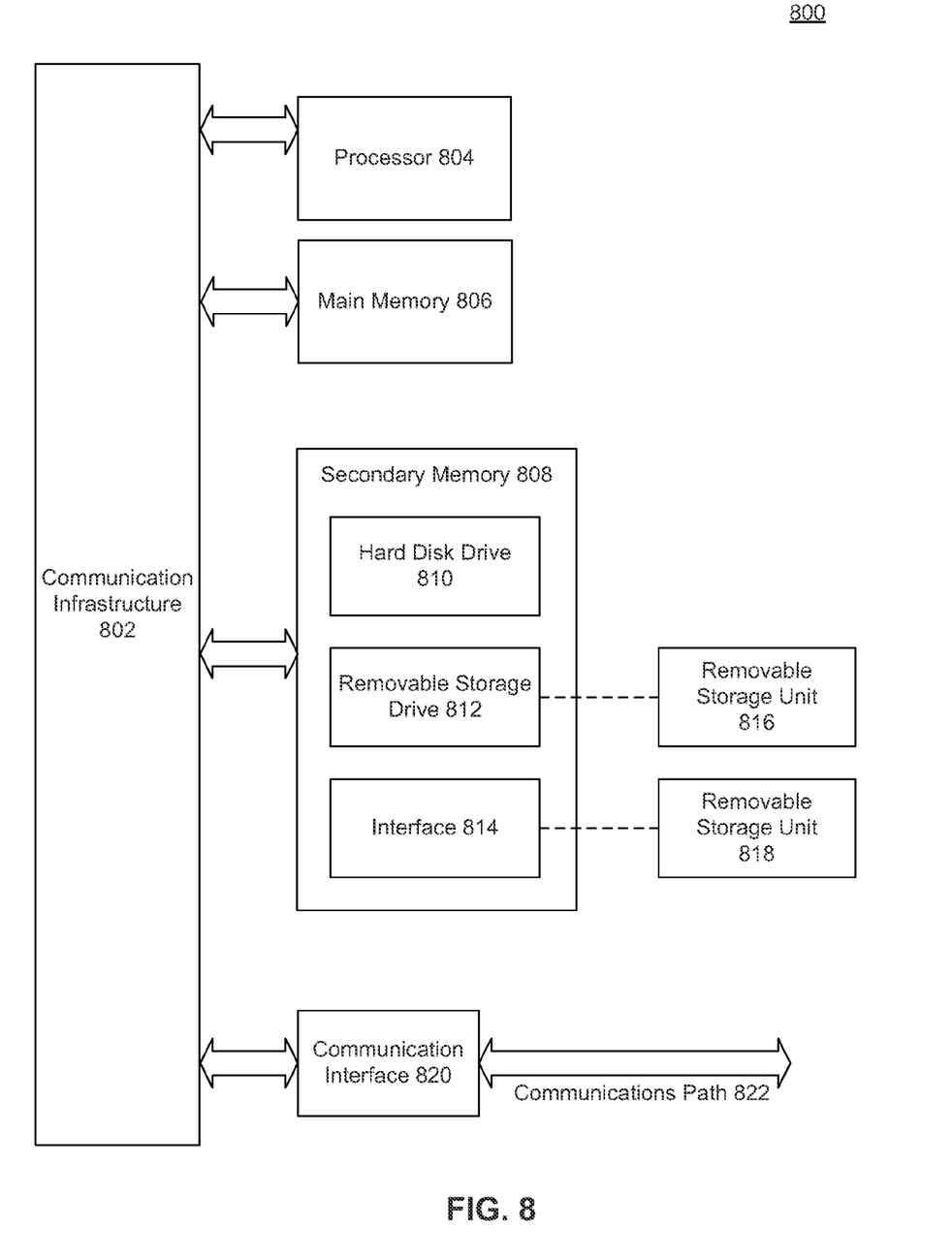
FIG. 8 illustrates an exemplary computer system that can be used to implement aspects of embodiments.

Embodiments of the present disclosure can be implemented in hardware, software or as a combination of software and hardware. Consequently, embodiments of the disclosure may be implemented in the environment of a computer system or other processing system. An example of such a computer system 800 is shown in FIG. 8. Embodiments described in FIGS. 1, 2, and 3 may execute on one or more computer systems 800. Furthermore, each of the steps of the processes depicted in FIGS. 4 through 7 can be implemented on one or more computer systems 800.

Computer system 800 includes one or more processors, such as processor 804. Processor 804 can be a special purpose or a general purpose digital signal processor. Processor 804 is connected to a communication infrastructure 802 (for example, a bus or network). Various software implementations are described in terms of this exemplary computer system. After reading this description, it will become apparent to a person skilled in the relevant art(s) how to implement the disclosure using other computer systems and/or computer architectures.

Computer system 800 also includes a main memory 806, preferably random access memory (RAM), and may also include a secondary memory 808. Secondary memory 808 may include, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and other removable storage units 818 and interfaces 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCMCIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. These computer program products are means for providing software to computer system 800.

Computer programs (also called computer control logic) are stored in main memory 806 and/or secondary memory 808. Computer programs may also be received via communications interface 820. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for monitoring performance of a thread processing a transaction, comprising:
    determining, at a processing server, whether the thread is a parent thread or a child thread based on monitoring data in a call context of the thread;
    inserting, by the processing server, an identifier into the call context when the thread is the parent thread that lacks an existing identifier, and allowing the thread to inherit the identifier from an active parent thread when the thread is the child thread; and
    recording, to a trace file, tracked data comprising the identifier and relating to a method called by the thread while processing the transaction.

2. The method of claim 1, further comprising:
    receiving, at the processing server, a request from a user client to process the transaction;
    initiating, at the processing server, the thread to process the transaction; and
    outputting the trace file to a data warehouse for performance analysis.

3. The method of claim 1, wherein the determining comprises:
    interrogating the call context of the thread;
        identifying the thread as the parent thread when the call context lacks the monitoring data;
        identifying the thread as the parent thread when the call context includes the monitoring data comprising the existing identifier that equals a stored identifier for the thread; and
        identifying the thread as the child thread when the call context includes the monitoring data comprising the existing identifier that does not equal the stored identifier for the thread.

4. The method of claim 1, further comprising:
    allocating a data structure in the processing server when the thread has not been detected previously by the processing server.

5. The method of claim 1, wherein the recording comprises:
    instrumenting application code utilized in processing the transaction; and
    recording transaction data from the method within the instrumented application code as the tracked data.

6. The method of claim 5, wherein the instrumenting comprises:
    selecting the method for monitoring based on activities pre-designated as important for performance monitoring.

7. The method of claim 1, wherein the identifier comprises a thread identifier and a transaction identifier.

8. A system for application performance monitoring in a processing server, comprising:
    a processor configured to initiate a thread to process a transaction;
    a monitoring module configured to:
        determine whether the thread is a parent thread or a child thread based on monitoring data in a call context of the thread; and
        insert an identifier into the call context when the thread is the parent thread that lacks an existing identifier, and allow the thread to inherit the identifier from an active parent thread when the thread is the child thread;
    wherein the monitoring module is further configured to record, to a trace file, tracked data comprising the identifier and relating to a method called by the thread while processing the transaction.

9. The system of claim 8, further comprising a transceiver configured to:
    receive a request from a user client to process the transaction; and
    output the trace file to a data warehouse for performance analysis.

10. The system of claim 8, wherein the monitoring module is further configured to:
    interrogate the call context of the thread;
    identify the thread as the parent thread when the call context lacks the monitoring data;
    identify the thread as the parent thread when the call context includes the monitoring data comprising the existing identifier that equals a stored identifier for the thread; and
    identify the thread as the child thread when the call context includes the monitoring data comprising the existing identifier that does not equal the stored identifier for the thread.

11. The system of claim 8, further comprising:
    a memory, wherein the monitoring module is further configured to allocate a data structure in the memory when the thread has not been detected previously by the monitoring module.

12. The system of claim 8, further comprising:
    an instrumenting module configured to instrument application code utilized in processing the transaction;
    wherein the monitoring module is further configured to record transaction data from the method within the instrumented application code to the trace file as the tracked data.

13. The system of claim 12, wherein the instrumenting module is further configured to select the method for monitoring based on activities pre-designated as important for performance monitoring.

14. The system of claim 8, wherein the identifier comprises a thread identifier and a transaction identifier.

15. A non-transitory computer-readable storage medium having control logic recorded thereon that, when executed by a processor, causes the processor to perform a method for monitoring performance of a thread processing a transaction in a processing server, the method comprising:
    determining whether the thread is a parent thread or a child thread based on monitoring data in a call context of the thread;
    inserting an identifier into the call context when the thread is the parent thread that lacks an existing identifier, and allowing the thread to inherit the identifier from an active parent thread when the thread is the child thread; and
    recording, to a trace file, tracked data comprising the identifier and relating to a method called by the thread while processing the transaction.

16. The non-transitory computer-readable medium of claim 15, further comprising:
    receiving a request from a user client to process the transaction;
    initiating the thread to process the transaction; and
    outputting the trace file to a data warehouse for performance analysis.

17. The non-transitory computer-readable medium of claim 15, wherein the determining comprises:

interrogating the call context of the thread;
identifying the thread as the parent thread when the call context lacks monitoring data;
   identifying the thread as the parent thread when the call context includes the monitoring data comprising the existing identifier that equals a stored identifier for the thread; and
   identifying the thread as the child thread when the call context includes the monitoring data comprising the existing identifier that does not equal the stored identifier for the thread.

18. The non-transitory computer-readable medium of claim 15, further comprising:
   allocating a data structure in the processing server when the processing server has not previously detected the thread.

19. The non-transitory computer-readable medium of claim 15, wherein the recording comprises:
   instrumenting application code utilized in processing the transaction; and
   recording transaction data from the method within the instrumented application code as the tracked data.

20. The non-transitory computer-readable medium of claim 15, wherein the instrumenting comprises:
   selecting the method for monitoring based on activities pre-designated as important for performance monitoring.

* * * * *